No. 832,335. PATENTED OCT. 2, 1906.
C. McDONALD.
BABY GATE.
APPLICATION FILED MAY 12, 1905.
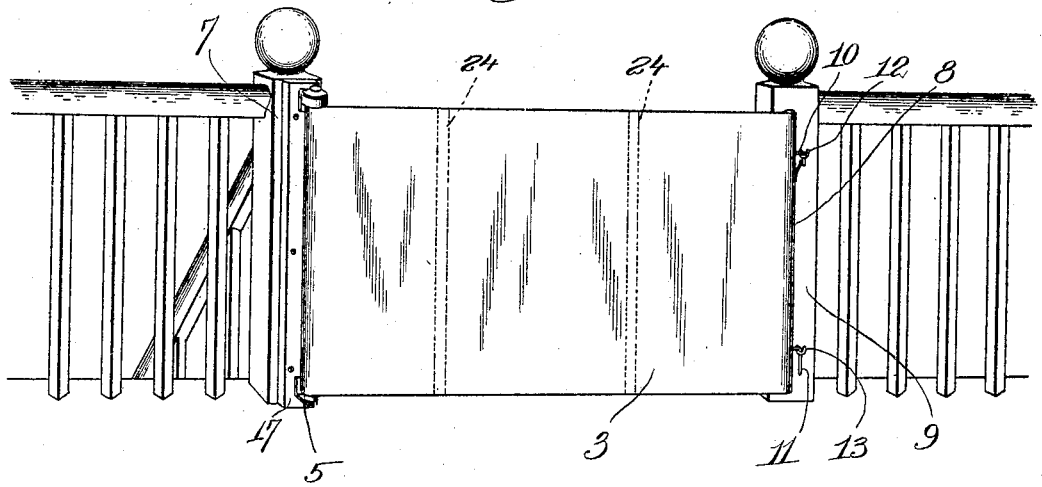
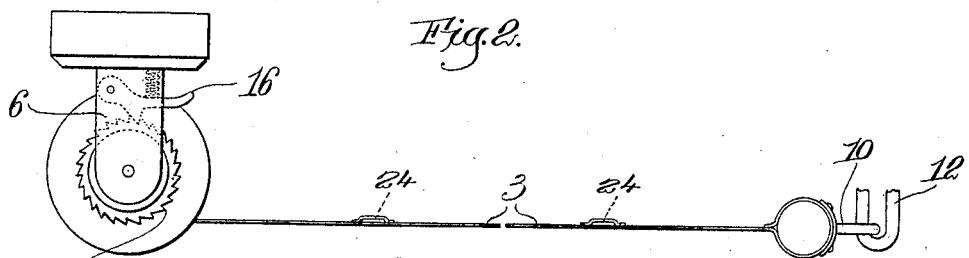
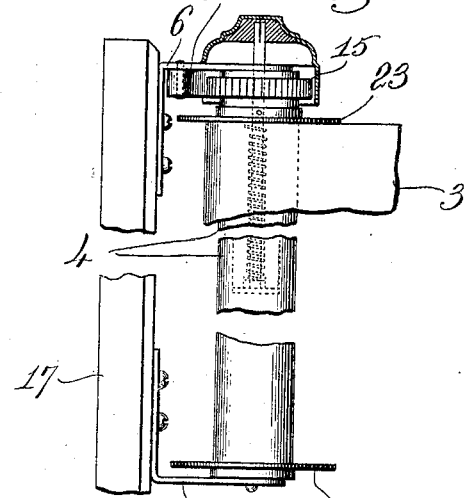
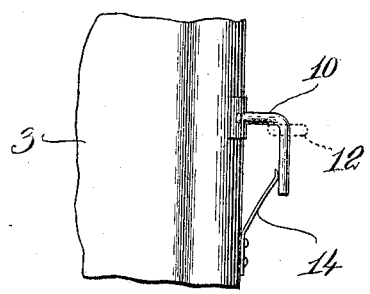
Witnesses
Thomas J. Drummond
A. W. Knapp
Inventor
Charles McDonald
by Mosley & Gregory
Attys.

UNITED STATES PATENT OFFICE.

CHARLES McDONALD, OF BOSTON, MASSACHUSETTS.

BABY-GATE.

No. 832,335. Specification of Letters Patent. Patented Oct. 2, 1906.

Application filed May 12, 1905. Serial No. 260,162.

*To all whom it may concern:*

Be it known that I, CHARLES MCDONALD, a citizen of the United States, residing at Boston, in the county of Suffolk and State of Massachusetts, have invented an Improvement in Baby-Gates, of which the following description, in connection with the accompanying drawings, is a specification, like figures on the drawings representing like parts.

This invention relates to a gate to be placed at the head of a staircase to prevent small children from falling.

The gate is made of some flexible material, such as canvas, and is mounted on a spring-roll which stands vertically and is secured to one side of the landing. The free end of the gate carries hooks or similar fastening devices by means of which it can be fastened to the opposite side of the landing when the gate is unwound from the roll. A suitable locking device is employed to lock the roller, so that when the gate has been unrolled sufficiently to be stretched across the opening or passage-way to be closed the spring-roller can be locked, thus preventing further unrolling thereof.

In the drawings, Figure 1 is a view showing my improved gate applied to the upper landing of the staircase. Fig. 2 is a top plan view of my improved gate. Fig. 3 is an enlarged elevation of the spring-roll and its mounting, part thereof being shown in section; and Fig. 4 is a detail hereinafter described.

My improved gate may be used in a great variety of places; but for the sake of illustration I have shown it as employed at the upper landing of a staircase. The gate itself is made of some suitable flexible material 3, canvas or duck being a good material. This gate is wound upon a spring-roller 4 of some suitable construction, which is journaled in bearings 5 and 6, which are adapted to be secured to the newel-post 7. The fabric of which the gate is made may be of any suitable length, dependent upon the width of the opening or passage which it is desired to close, and may be of any suitable width, depending on the height of gate desired. The spring of the spring-roll is arranged so that it tends to wind the fabric of the gate up upon the roll, and as the fabric is unrolled the spring is wound up. The free edge 8 of the gate is provided with suitable fastening devices adapted to engage coöperating fastening devices on the other newel-post 9. The fastening devices I have herein illustrated are simply hooks 10 and 11, carried by the gate, which are adapted to engage eyes 12 and 13, projecting from the newel-post 9. The hook 11 is longer than the hook 10, so that in fastening the free edge of the gate to the newel-post 9 the hook 11 may be first inserted in its eye or staple and then the hook 10 is inserted. A suitable keeper 14, preferably in the nature of a spring, may be employed to prevent the hook 10 from being disengaged from its eye or staple. If a spring-keeper is used, I propose to so temper the spring that it will be too stiff for a child to manipulate.

When the gate is in use, as shown in Fig. 1, it is important that the spring-roll should be locked, so as to prevent its being unwound by pressure against the gate, for otherwise if a child should lean against the gate the material of the gate would unwind from the spring-roll sufficiently to permit a child to fall down the stairs underneath the gate.

The lock I have herein shown comprises a ratchet-wheel 15, which is rigid with the spring-roll, and a suitable spring-pressed pawl 16, coöperating with said ratchet, said pawl and ratchet being so constructed that when they are in engagement they lock the roll from unwinding. The pawl is shown as pivoted to the bearing 6 and has a tailpiece projecting therefrom by means of which it may be disengaged from the ratchet-wheel when the gate is to be extended. The bearings 5 and 6 may be secured directly to the newel-post or may be secured to a base-piece or backing-piece 17, which in turn is secured to the newel-post. I prefer the latter construction, because the said backing-piece serves to hold the bearings in place during transportation and said backing-piece, bearings, roll, and gate make a complete structure.

I preferably employ some suitable guide, so that the gate will roll true onto the spring-roll when it is being wound up. As herein shown, these guides are in the form of guide-flanges 23, which are fast to the roll itself. I have also shown the fabric 3 of the gate as provided with a plurality of stiffening-strips 24, which are secured to the fabric or sewed into it and which prevent the gate from sagging.

My invention may also be embodied in a gate which is employed to partially close an ordinary door for the purpose of preventing people outside a room from looking into it.

Such doors are frequently used between rooms in business houses. In some buildings two stairways are arranged side by side, one leading up from a certain landing and the other leading down therefrom. By placing my improved gate on the newel-post or banister between the two stairways it is possible to use the gate for closing either stairway.

Various changes in the construction of the device may be made without departing from the invention.

Having described my invention, what I claim as new, and desire to secure by Letters Patent, is—

1. A baby-gate comprising a backing-piece adapted to be secured to a support, bearings carried by said backing-piece, a spring-roll journaled in said bearings, a web of flexible material mounted on said roll, automatically-operating means to lock and hold the roll against unwinding movement, and fastening devices on the free end of the web of flexible material to secure said end to a support.

2. In a baby-gate as described, a backing-piece, bearings mounted on said backing-piece, a spring-roll mounted in said bearings, a flexible curtain mounted on said roll, bracing-strips attached to said flexible curtain at intervals throughout its length to hold the curtain fully extended laterally, means for holding said curtain in its operative or open position and means for automatically locking the aforesaid roll, bearing the said curtain, against further unwinding.

In testimony whereof I have signed my name to this specification in the presence of two subscribing witnesses.

CHAS. McDONALD.

Witnesses:
   Louis C. Smith,
   Margaret A. Dunn.